US009054855B2

(12) United States Patent
Ben-Bassat (10) Patent No.: US 9,054,855 B2
(45) Date of Patent: Jun. 9, 2015

(54) SYNCHRONIZING PHASES BETWEEN LOCAL LO GENERATION CIRCUITS

(71) Applicant: Intel Corporation, Santa Clara, CA (US)

(72) Inventor: Assaf Ben-Bassat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/047,117

(22) Filed: Oct. 7, 2013

(65) Prior Publication Data

US 2015/0098541 A1    Apr. 9, 2015

(51) Int. Cl.
*H04L 7/04* (2006.01)
*H04L 25/08* (2006.01)
*H04B 7/04* (2006.01)

(52) U.S. Cl.
CPC *H04L 7/04* (2013.01); *H04L 25/08* (2013.01); *H04B 7/0413* (2013.01)

(58) Field of Classification Search
CPC ......... H04L 7/04; H04L 25/08; H04L 7/0004; H04L 7/0008; H04L 7/0091; H04L 7/0338; H04L 7/10; H04B 7/0413
USPC ......... 375/261, 262, 269, 271, 278, 285, 295, 375/299, 316, 321, 322, 324, 333, 340, 342, 375/345, 350, 354, 355, 356–359, 361, 371
See application file for complete search history.

(56) References Cited

U.S. PATENT DOCUMENTS

| | | | |
|---|---|---|---|
| 7,148,758 B1 * | 12/2006 | Ross et al. ....................... 331/17 |
| 8,139,670 B1 * | 3/2012 | Son et al. ...................... 375/267 |
| 8,340,619 B1 * | 12/2012 | Shirvani-Mahdavi et al. ............................. 455/318 |
| 8,577,305 B1 * | 11/2013 | Rossi et al. ...................... 455/76 |
| 2007/0236230 A1 * | 10/2007 | Tanbakuchi et al. ........... 324/650 |
| 2010/0052743 A1 * | 3/2010 | Kamizuma et al. ............ 327/144 |
| 2010/0067633 A1 * | 3/2010 | Den Besten ................... 375/373 |
| 2010/0091921 A1 * | 4/2010 | Den Besten et al. .......... 375/354 |
| 2010/0237958 A1 * | 9/2010 | Goel et al. ...................... 331/135 |
| 2011/0105054 A1 * | 5/2011 | Cavin ............................... 455/86 |
| 2012/0201544 A1 * | 8/2012 | Zhang et al. ................... 398/115 |
| 2012/0230444 A1 * | 9/2012 | Ravid et al. .................... 375/267 |
| 2012/0275356 A1 * | 11/2012 | Aharony et al. ............... 370/310 |
| 2013/0195159 A1 * | 8/2013 | Morohashi ..................... 375/222 |
| 2013/0195467 A1 * | 8/2013 | Schmid et al. ................. 398/115 |
| 2013/0273956 A1 * | 10/2013 | Gallagher et al. ............. 455/509 |
| 2014/0312948 A1 * | 10/2014 | Fong et al. ..................... 327/163 |

* cited by examiner

*Primary Examiner* — Hirdepal Singh
(74) *Attorney, Agent, or Firm* — Schwegman Lundberg & Woessner, P.A.

(57) ABSTRACT

Embodiments of a system and method for synchronizing chains in a transceiver using central synchronization signals are generally described herein. In some embodiments, an RF signal having a reference frequency in a differential mode and a synchronization signal having a second frequency being the reference frequency divided by an integer in a common mode are produced at a oscillator generation circuit. The RF signal having a reference frequency in a differential mode and the synchronization signal having a second frequency being the reference frequency divided by an integer in a common mode are provided over each of a plurality of LO lines to a plurality of local LO generation circuit chains. Each synchronization signal having a second frequency being the reference frequency divided by an integer in a common mode is extracted at the plurality of local LO generation circuit chains. A phase of each RF signal having a reference frequency in a differential mode is synchronized in each of the plurality of local LO generation circuit chains using each extracted synchronization signal having a second frequency being the reference frequency divided by an integer in a common mode.

25 Claims, 4 Drawing Sheets

SYNCHRONIZING PHASES BETWEEN LOCAL LO GENERATION CIRCUITS

BACKGROUND

Multiple-input, multiple-output (MIMO) technology offers significant increases in data throughput and link range without additional bandwidth or increased transmit power, and has thus attracted attention in wireless communications. MIMO techniques spread the same total transmit power over multiple antennas to achieve an array gain that improves the spectral efficiency and/or diversity gain that improves the link reliability, e.g., reduced fading. MIMO is also planned to be used in Mobile radio telephone standards such as recent 3GPP and 3GPP2. In 3GPP, Long Term Evolution (LTE) standards utilize MIMO techniques.

In MIMO, multiple transmitters and receivers are used to transfer more data at the same time while taking advantage of multipath effects where transmitted information bounces off walls, ceilings, and other objects, reaching the receiving antenna multiple times via different angles and at slightly different times. MIMO takes advantage of multipath to combine the information from multiple signals improving speed and data integrity.

A MIMO radio transceiver is use to support processing of multiple signals for simultaneous transmission via a plurality of antennas and to support receive processing of multiple signals detected by the plurality of antennas. Voltage controlled oscillators are used to generate a local oscillator signal that are used to generate RF transmit signals and to down-convert received RF signals to intermediate frequency signals for processing.

MIMO radio transceiver designs may derive a LO (local oscillator) frequency using a divider that is embedded inside the RF chain, e.g., in each of the chains there is a divider that creates the LO frequency (Local LO Gen). The relative phase of the LO signal generated by the local LO generation divider has effects on system performance, such as DC in the receive path, which need to be mitigated. In order for the MIMO radio communications system to work best and reduce the overhead of dealing with these changes, it is valuable for the local LO Gen dividers to create signals with a relative constant phase. Synchronizing the LO Gen phase between the MIMO chains is a valuable consideration for WiFi transceivers that support beam-forming.

There are a few ways to mitigate these effects. A oscillator generation circuit that drives the LO frequency from the central location may be used. The use of a oscillator generation circuit is not practical because of the numerous high frequency traces that need to be used, and the strict restrictions on their layout. A second method is to keep the local LO generation circuit in operation for very long periods. However, this method is wasteful in power because even when the local LO generation is not working with the chains, the non-operational chains still consume power. A third method involves sending a synchronization signal from the central part of the circuit to the local logs. This adds another high frequency line per chain, e.g., 3 lines for a 3×3 system, that needs to be simulated, and therefore adds unnecessary complexity to the system and chip layout.

DETAILED DESCRIPTION

Embodiments described herein use existing differential lines leading from a oscillator generation circuit into each local LO generation circuit. The oscillator generation circuit creates an RF frequency signal have a frequency of $f_{VCO}$, a reference frequency, that is sent in differential mode over the LO lines to the divider in the local LO generation circuit. The oscillator generation circuit also creates a signal having a frequency of $f_{VCO}/N$ signal that is also sent over the LO lines, but in common mode. The $f_{VCO}/N$ signal in common mode is used by the chains, and, when extracted in each chain from the common mode, is used to synchronize to the same phase the dividers in the local LO generation circuit of the chains. Those skilled in the art will recognize that the term "circuit" is used generically and can mean a component or a plurality of components, active and/or passive, discrete or integrated, and which may be coupled together to provide a predetermined function.

Figure 1:
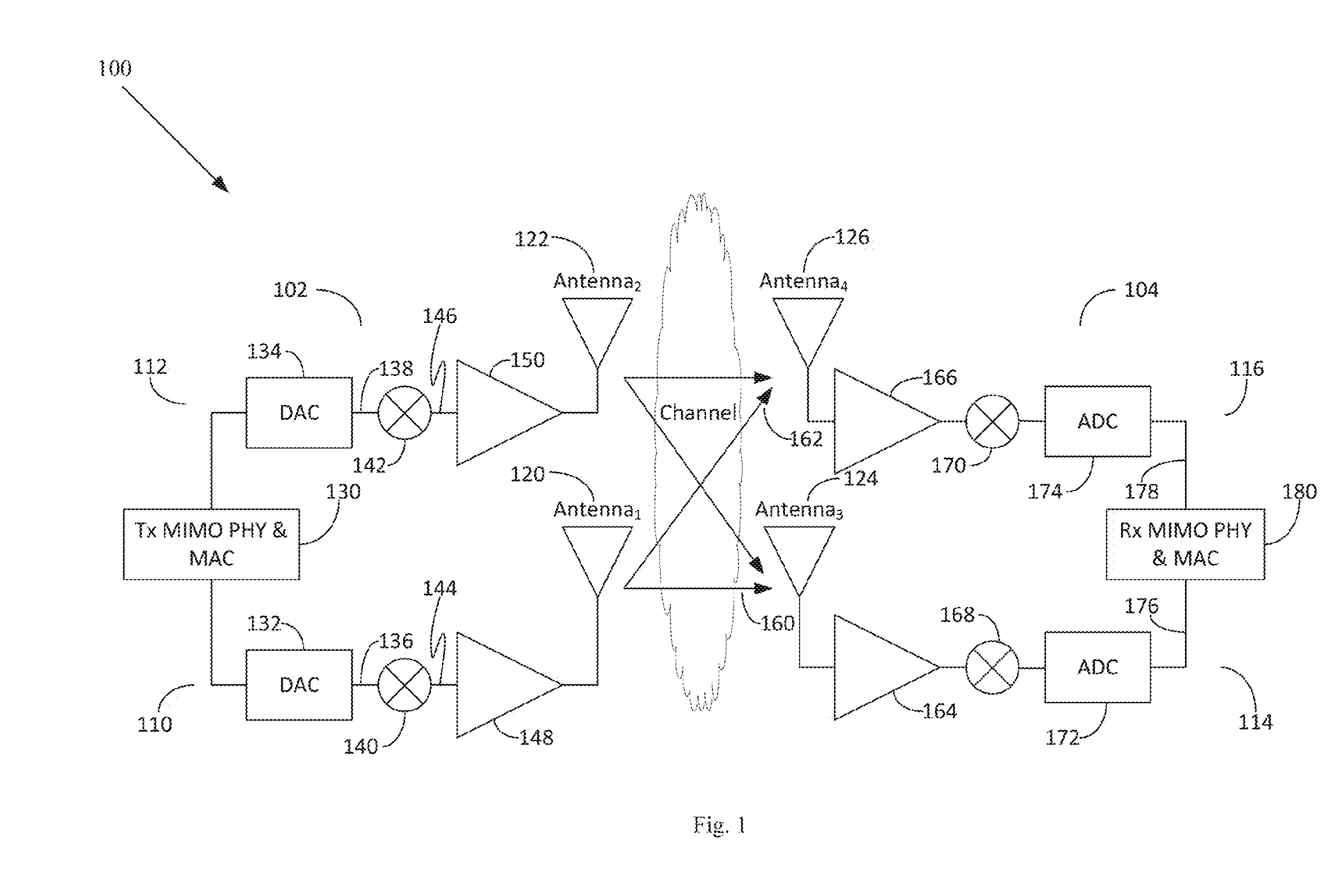
FIG. 1 illustrates an example of a MIMO system according to an embodiment.

FIG. 1 illustrates an example of a MIMO system 100 according to an embodiment. For simplicity, transmitter circuitry 102 is shown in one MIMO system while receiver circuitry 104 is shown in the other MIMO system. However, those skilled in the art will recognize that both systems may include at least one transmitter and at least one receiver, that additional chains may be implement, etc.

The multi-antenna MIMO system includes a full analog path 110, 112, 114, 116 for each antenna 120, 122, 124, 126 which provides maximum system performance and flexibility. Phase shifting, combining, beam-forming, etc. can be performed easily at digital baseband, e.g., on a per subcarrier basis in OFDM systems. This allows for "spatial multiplexing," but consumes more power and area than analog-only multi-antenna solutions.

As shown in FIG. 1, a transmitter MIMO physical (PHY) layer and media access (MAC) layer 130 provides digital baseband signals to digital-to-analog converters (DAC) 132, 134. The analog signals 136, 138 from the DACS 132, 134 are up-converted at mixers 140, 142 to RF signals 144, 146 for transmission. The RF signals 144, 146 are amplified at amplifiers 148, 150 and then transmitted using antenna$_1$ 120 and antenna$_2$ 122.

On the receiver side 104, antenna$_3$ 124 and antenna$_4$ 126 receive RF signals 160, 162 from both antenna$_1$ 120 and antenna$_2$ 122. On the receiver side 104, the RF signals 160, 162 are amplified by amplifiers 164, 166 and down-converted at mixers 168, 170. Analog-to-digital converters (ADC) 172, 174 convert the signals back to digital signals 176, 178 that are processed at the receiver MIMO physical (PHY) layer and media access (MAC) layer 180.

Oscillator signals may be used to synchronize each of the chains. However, as mentioned above, the relative phase of the LO signal generated has effects on system performance, such as DC in the receive path, which need to be mitigated while reducing the numerous high frequency traces used, conserving power and reducing unnecessary complexity to the system and chip layout.

Figure 2:
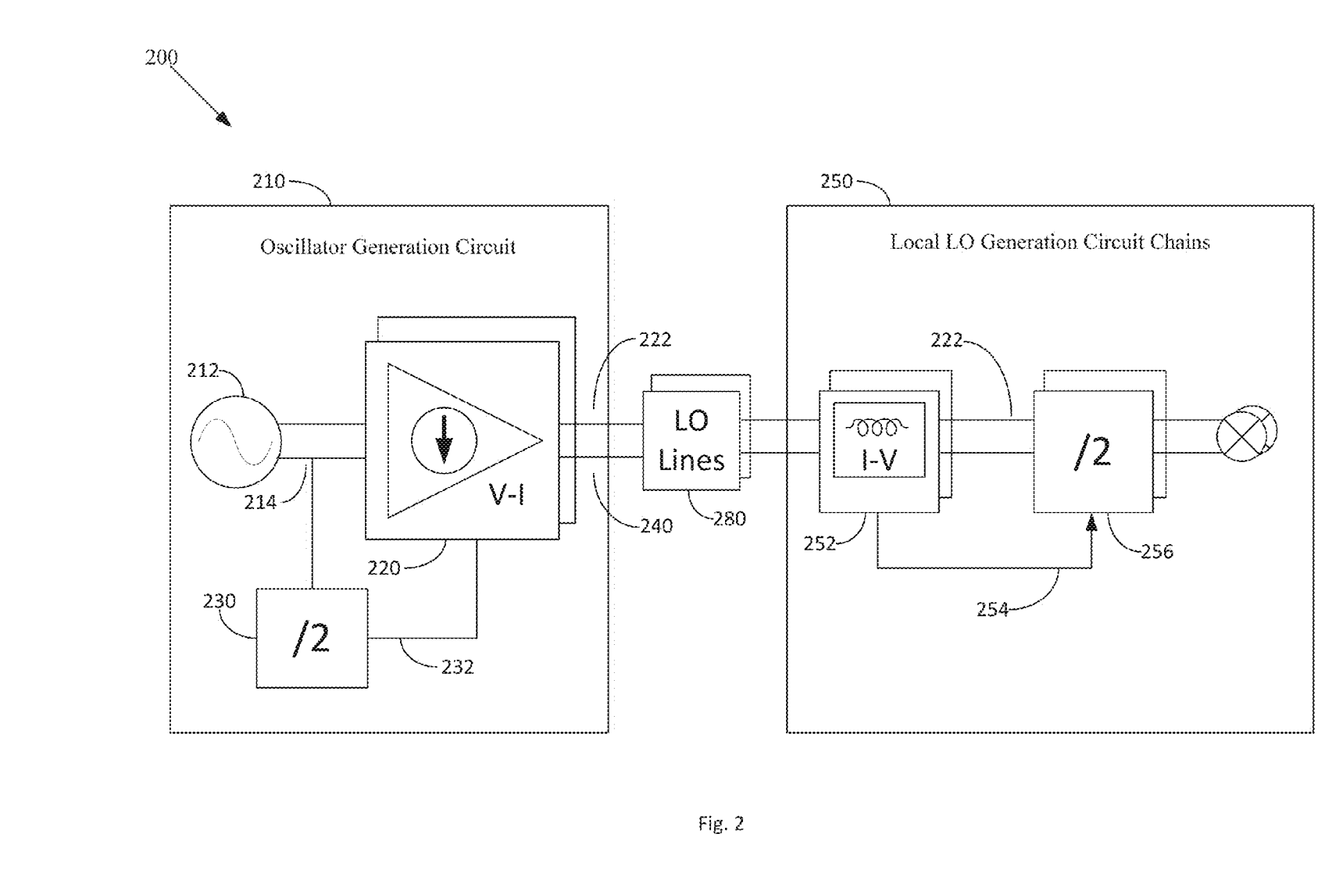
FIG. 2 illustrates synchronization of LO generation circuits having synchronized phases in a radio transceiver according to an embodiment.

FIG. 2 illustrates synchronization of LO generation circuits 200 having synchronized phases in a radio transceiver according to an embodiment. In FIG. 2, a oscillator generation circuit 210 and a local LO generation circuit per chain 250 are shown. The oscillator generation circuit 210 includes a voltage controlled oscillator (VCO) 212 that creates an RF frequency signal having a reference frequency, $f_{VCO}$ 214. The RF frequency signal having a reference frequency $f_{VCO}$ 214 is provided to a voltage controlled current supply 220 that creates an RF frequency current signal having a reference frequency $f_{VCO}$ 222 for each of the local LO generation circuit chains. The RF frequency signal having a reference frequency $f_{VCO}$ 214 is also provided to a divider 230 to generate a synchronization signal having a frequency $f_{VCO}/N$ 232, e.g., N=2. However, N may be any integer. In FIG. 2, the divider 230 divides the RF frequency signal having a frequency $f_{VCO}$ 214 by two. However, those skilled in the art will recognize that the divider may be implemented as any value divider according to needs of the circuit designer.

The synchronization signal having a frequency $f_{VCO}/N$ 232 is also provided to the voltage controlled current supply 220 to produce a synchronization current signal having frequency $f_{VCO}/N$ in common mode 240. The LO lines 280 provide a set of paired paths from the oscillator generation circuit 210 to each of the local LO generation circuit chains 250. In common mode, the LO lines 280 to each of the local LO generation circuit chains 250 are driven with the same phase, i.e., both of a set of paired paths of LO lines 250 have the same signal on them. The RF frequency current signal having frequency $f_{VCO}$ 222 is provided in differential mode to the local LO generation circuit chains 250 via LO lines 280. In differential mode, the LO lines to each of the local LO generation circuit chains are driven with opposite phases, i.e., when the current is a high level on one of the LO lines, the current is a low level on the other of the LO line from a set of paired paths, and vice versa. This allows the separation of signals on the receiving side, with a dedicated circuit that detects only the difference between the signals, i.e., only the differential data or the sum of the signals. The synchronization current signal having frequency $f_{VCO}/N$ 240 is provided to each of the local LO generation circuit chains 250 in common mode via the LO lines 280.

At the local LO generation circuit chains 250, a current to voltage filter 252 extracts the synchronization current signal having frequency $f_{VCO}/N$ 240 in common mode to provide synchronization signals 254 to local LO generation circuit dividers 256. The RF frequency current signal having frequency $f_{VCO}$ 222 is also provided to the local LO generation circuit dividers 256, but in differential mode. Accordingly, each RF frequency current signal having frequency $f_{VCO}$ 222 at the local LO generation circuit dividers 256 in each chain are synchronized via the extracted synchronization signal 254.

Therefore, each synchronization current signal having frequency $f_{VCO}/N$ in common mode 240 is created in the oscillator generation circuit 210 by the synchronization divider 230 and then transmitted in common mode on each of the LO lines 280 as the RF frequency current signal having frequency $f_{VCO}$ in differential mode 222. The synchronization current signal having frequency $f_{VCO}/N$ in common mode 240 is sent to the chains and when extracted in each chain is used to synchronize the local LO generation circuit dividers 256 of the chains to the same phase.

Accordingly, the existing LO lines 280 from the oscillator generation circuit 210 to each of the local LO generation circuit chains 250, e.g., these lines pass twice the LO frequency, are also used to pass the synchronization current signal having frequency $f_{VCO}/N$ 240 in common mode on these lines. At the local LO generation part, the synchronization current signal having frequency $f_{VCO}/N$ 240 is extracted and used as a synchronization pulse 254 on top of signal lines to the divider 256.

The synchronization of the local LO generation circuits per chain 250 according to an embodiment enables use of the local LO generation circuit per chain 250 which is better from a LO delivery perspectives. Power to the local LO generation circuit chains 250 may be powered down when not used because the synchronization pulse 254 provided by the synchronization current signal having frequency $f_{VCO}/N$ 240 is transferred via the LO lines 280 in common mode to the each LO generation circuit divider 256 in the local LO generation circuit chains 250. Moreover, there is no need for extra synchronization lines because the synchronization information, e.g., the synchronization current signal having frequency $f_{VCO}/N$ 240, is transmitted on the same lines as twice the LO.

After a command is received to synchronize the LO dividers 256, the synchronization divider 230 in the oscillator generation circuit 210 may be powered down. Thus, the system works exactly the same with synchronization as without the synchronization mechanism, but without enduring a performance hit. Power savings may be provided by powering down the local LO generation circuit chains 250 when not transmitting in MIMO mode. In addition, silicon area may be saved and the routing of extra synchronization lines may be avoided while enabling beam forming.

Figure 3:
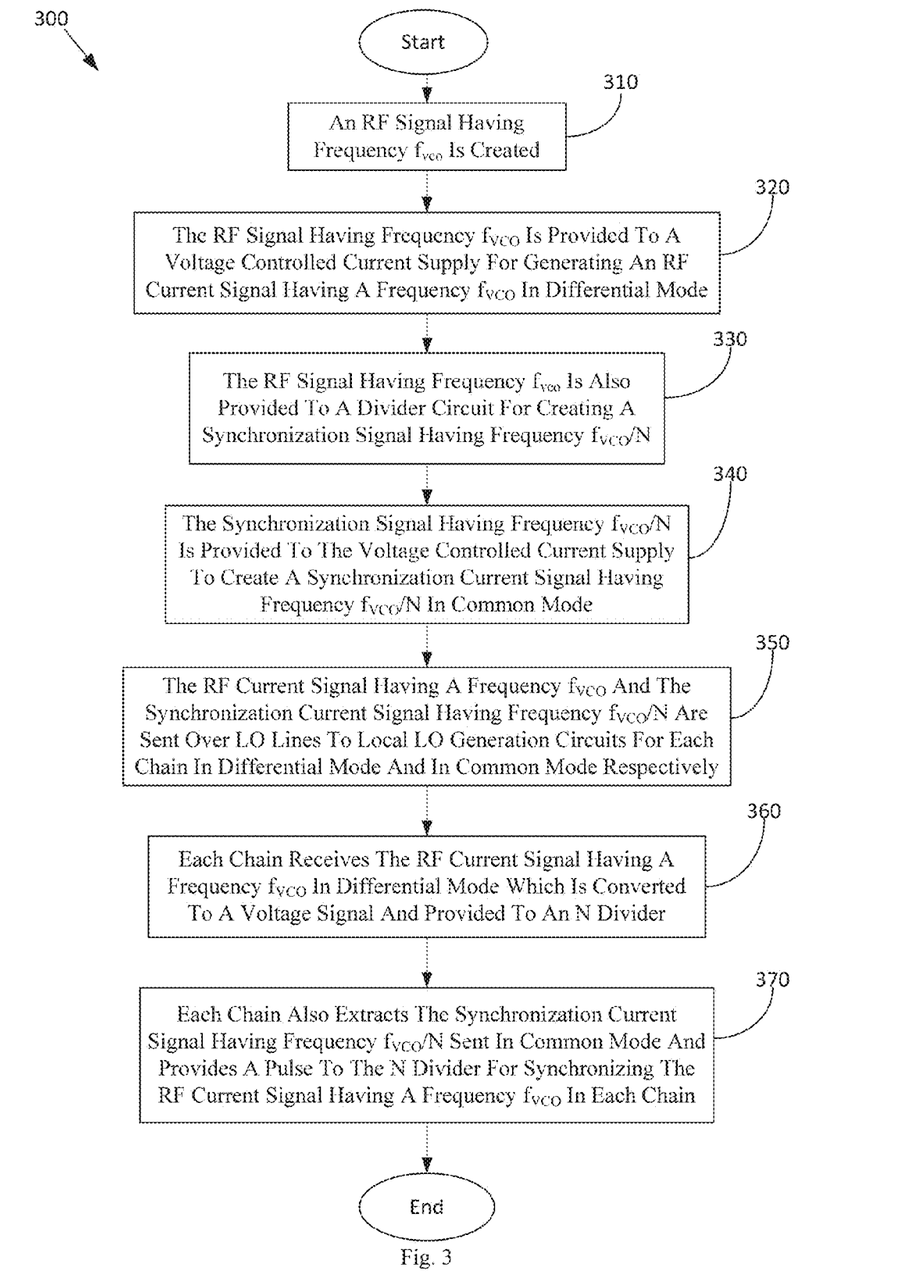
FIG. 3 is a flowchart of a method for synchronizing phases between local LO generation circuits according to an embodiment.

FIG. 3 is a flowchart 300 of a method for synchronizing phases between local LO generation circuits according to an embodiment. In FIG. 3, a RF signal having frequency $f_{VCO}$ is created 310. The RF signal having frequency $f_{VCO}$ is provided to a voltage controlled current supply for generating an RF current signal having a frequency $f_{VCO}$ in differential mode 320. The RF signal having frequency $f_{VCO}$ is also provided to a divider circuit for creating a synchronization signal having frequency $f_{VCO}/N$ 330. The synchronization signal having frequency $f_{VCO}/N$ is provided to the voltage controlled current supply to create a synchronization current signal having frequency $f_{VCO}/N$ in common mode 340. The RF current signal having a frequency $f_{VCO}$ and the synchronization current signal having frequency $f_{VCO}/N$ are sent over LO lines to local LO generation circuits for each chain in differential mode and in common mode respectively 350. Each chain receives the RF current signal having a frequency $f_{VCO}$ in differential mode which is converted to a voltage signal and provided to an N divider 360. Each chain also extracts the synchronization current signal having frequency $f_{VCO}/N$ sent in common mode and provides a pulse to the N divider for synchronizing the RF current signal having a frequency $f_{VCO}$ in each chain 370.

Figure 4:
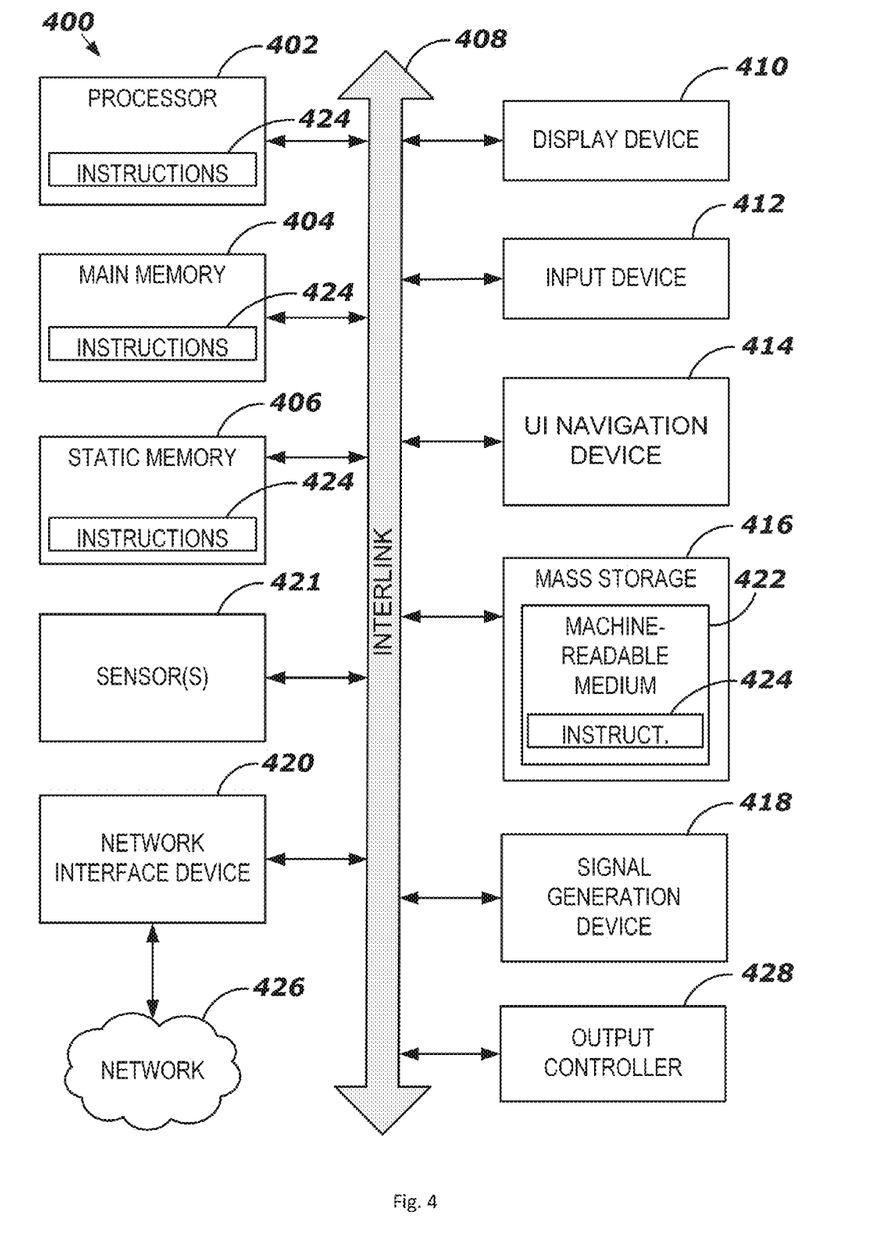
FIG. 4 illustrates a block diagram of an example machine for synchronizing phases between local LO generation circuits according to an embodiment.

FIG. 4 illustrates a block diagram of an example machine 400 for synchronizing phases between local LO generation circuits according to an embodiment upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine and/or a client machine in server-client network environments. In an example, the machine 400 may act as a peer machine in peer-to-peer (P2P) (or other distributed) network environment. The machine 400 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 402 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 402 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 400 may include a hardware processor 402 (e.g., a central processing unit (CPU), a graphics processing unit (GPU), a hardware processor core, or any combination thereof), a main memory 404 and a static memory 406, at least some of which may communicate with others via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR)) connection to communicate or control one or more peripheral devices (e.g., a printer, card reader, etc.).

The storage device 416 may include at least one machine readable medium 422 on which is stored one or more sets of data structures or instructions 424 (e.g., software) embodying or utilized by any one or more of the techniques or functions described herein. The instructions 424 may also reside, at least partially, additional machine readable memories such as main memory 404, static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) that configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)). Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Accordingly, embodiments use existing differential lines leading from a oscillator generation circuit into each local LO generation circuit. The oscillator generation circuit creates an RF frequency signal that is sent in differential mode over the LO lines to the divider in the local LO generation circuit. The oscillator generation circuit also creates an $f_{VCO}/N$ signal that is also sent over the LO lines, but in common mode. The $f_{VCO}/N$ signal in common mode is used by the chains, and, when extracted in each chain from the common mode, is used to synchronize to the same phase the dividers in the local LO generation circuit of the chains.

ADDITIONAL NOTES & EXAMPLES

Example 1 may include subject matter (such as a method or means for performing acts) for producing, at an oscillator generation circuit, a radio frequency (RF) signal having a reference frequency in a differential mode and a synchronization signal in a common mode having a second frequency being the reference frequency divided by an integer;
  providing, over each of a plurality of LO lines to a plurality of local LO generation circuits, the RF signal having the reference frequency in the differential mode and the synchronization signal having the second frequency in the common mode;
  extracting a synchronization signal having the second frequency for each of the plurality of local LO generation circuits; and
  synchronizing a phase of each RF signal having the reference frequency in the differential mode in each of the plurality of local LO generation circuits using the extracted synchronization signal having the second frequency.

In Example 2 the subject matter of Example may optionally include, wherein the producing, at the oscillator generation circuit, the RF signal having the reference frequency in the differential mode further comprises creating the RF signal having the reference frequency at the oscillation generation circuit and converting, by a voltage controlled current supply, the RF signal having the reference frequency to an RF current signal having the reference frequency in differential mode.

In Example 3 the subject matter of any one or more of Examples 1 to 2 may optionally include, wherein the producing, at the oscillation circuit, further comprises creating the RF signal having the reference frequency at the oscillation circuit, dividing a copy of the RF signal having the reference frequency by the integer to produce the synchronization signal and converting, by the voltage controlled current supply, the synchronization signal having the second frequency being the reference frequency divided by the integer to an synchronization current signal having the second frequency being the reference frequency divided by the integer in the common mode.

In Example 4 the subject matter of any one or more of Examples 1-3 may optionally include, wherein the producing, at the oscillator generation circuit, further comprises creating an RF frequency signal having the reference frequency at oscillation circuit, dividing a copy of the RF frequency signal having the reference frequency by a factor of N to produce the synchronization signal having the second frequency being the reference frequency divided by the integer and converting, by a voltage controlled current supply, the synchronization signal having the second frequency being the reference frequency divided by the integer to an synchronization current signal having the second frequency being the reference frequency divided by the integer in the common mode.

In Example 5 the subject matter of any one or more of Examples 1-4 may optionally include, wherein the extracting the synchronization signal having the second frequency being the reference frequency divided by the integer for each of the plurality of local LO generation circuits further comprises using a current to voltage filter to extract the synchronization signal having the second frequency being the reference frequency divided by the integer in the common mode.

In Example 6 the subject matter of any one or more of Examples 1-5 may optionally include, wherein the providing, over each of the plurality of LO lines to the plurality of local LO generation circuits, the RF signal having the reference frequency further comprises providing an RF current signal having the reference frequency to a current to voltage filter to convert the RF current signal having the reference frequency to an RF voltage signal having the reference frequency.

Example 7 may include subject matter (such as a method or means for performing acts) for creating, at an oscillator generation circuit, an RF current signal having a reference frequency and a synchronization current signal having a second frequency being the reference frequency divided by an integer;
  providing, over each of a plurality of LO lines to a plurality of local LO generation circuits, the RF current signal in differential mode and the synchronization current signal in common mode to a current-to-voltage source in each of the plurality of local of local LO generation circuits to convert the RF current signal to an RF voltage signal having the reference frequency and to convert the synchronization current signal to a synchronization voltage signal having the reference frequency divided by the integer;
  extracting the synchronization voltage signal having the second frequency being the reference frequency divided by the integer at each of the current-to-voltage sources in each of the plurality of local LO generation circuits; and
  synchronizing a phase of each RF voltage signal having the reference frequency in each of the plurality of local LO generation circuits using each extracted synchronization current signal having the reference frequency divided by the integer.

In Example 8 the subject matter of Example 7 may optionally include, further comprises providing the RF voltage signal having the reference frequency in each of the local LO generation circuits to a divider in each chain to produce a divided RF voltage signal having the reference frequency.

In Example 9 the subject matter of any one or more of Examples 7-8 may optionally include, wherein the synchronizing the phase of each RF voltage signal having the reference frequency in each of the plurality of local LO generation circuits using each extracted synchronization signal having the second frequency being the reference frequency divided by the integer further comprises synchronizing the phase of each RF voltage signal having the reference frequency at the at each divider in each chain using the synchronization signal having the second frequency being the reference frequency divided by the integer of each chain.

In Example 10 the subject matter of any one or more of Examples 7-9 may optionally include, wherein the creating the synchronization current signal having a second frequency being the reference frequency divided by an integer comprises creating the synchronization current signal having a second frequency being the reference frequency divided by two.

Example 11 includes subject matter (such as a device, apparatus, client or system) including an oscillator generation circuit arranged to produce an RF signal having a reference frequency in a differential mode and a synchronization signal having a second frequency being the reference frequency divided by an integer in a common mode; and
  a plurality of local LO generation circuits used to generate a separate component of a MIMIO transmission, the local LO generation circuits being coupled to the oscillation generation circuit via a plurality of LO lines, the plurality of local LO generation circuits arranged to receive the RF signal having the reference frequency in a differential mode and the synchronization signal having the second frequency being the reference frequency divided by the integer in the common mode;
  wherein the plurality of local LO generation circuits includes a filter arranged to extract the synchronization signal having the second frequency being the reference frequency divided by the integer for each of the plurality of local LO generation circuits, each extracted synchronization signal having the second frequency being the reference frequency divided by the integer being used to synchronize a phase of each RF signal having the reference frequency in each of the plurality of local LO generation circuits.

In Example 12 the subject matter of Example 11 may optionally include, wherein the oscillation generation circuit further includes a voltage controlled oscillator for generating the RF signal having the reference frequency.

In Example 13 the subject matter of any one or more of Examples 11-12 may optionally include, wherein the oscillation generation circuit further includes a voltage controlled current supply arranged to convert the RF signal having the reference frequency to an RF current signal having the reference frequency in the differential mode.

In Example 14 the subject matter of any one or more of Examples 11-13 may optionally include, wherein the oscillation generation circuit further includes a divider arranged to divide a copy of the RF signal having the reference frequency by the integer to produce a synchronization signal having the reference frequency divided by the integer.

In Example 15 the subject matter of any one or more of Examples 11-14 may optionally include, wherein the voltage controlled current supply is further arranged to convert the synchronization signal having the second frequency being the reference frequency divided by the integer to a synchronization current signal having the second frequency being the reference frequency divided by the integer in the common mode.

In Example 16 the subject matter of any one or more of Examples 11-15 may optionally include, wherein the filter extracts the synchronization signal having the reference frequency divided by the integer.

In Example 17 the subject matter of any one or more of Examples 11-16 may optionally include, wherein the filter is arranged to convert the RF signal having the reference frequency in the differential mode to an RF voltage signal having the reference frequency.

In Example 18 the subject matter of any one or more of Examples 11-17, wherein the local LO generation circuit further includes a divider to receive the RF voltage signal having the reference frequency in each of the local LO generation circuits to produce a divided RF voltage signal having the reference frequency divided by the integer.

In Example 19 the subject matter of any one or more of Examples 11-18 may optionally include, wherein the divider synchronizes the phase of each RF voltage signal having the reference frequency in each of the plurality of local LO generation circuits using each extracted synchronization signal having the reference frequency divided by the integer.

Example 20 includes subject matter (such as a device, apparatus, client or system) including a multiple-input, multiple-output (MIMO) transceiver having a plurality of transceiver chains including receiver and transceiver chains, wherein the transceiver chains are used to transmit and receive a separate component of a MIMIO signal, and
  a synchronized local oscillator system for synchronizing signals in at least one of the plurality of transceiver chains, wherein the synchronized local oscillator system includes:
    an oscillator generation circuit arranged to produce an RF signal having a reference frequency in a differential mode and a synchronization signal having a second frequency being the reference frequency divided by an integer in a common mode; and
    a plurality of local LO generation circuits associated with at least one of the plurality of transceiver chains, coupled to the oscillation generation circuit via a plurality of LO lines, the plurality of local LO generation circuits arranged to receive the RF signal having the reference frequency in a differential mode and the synchronization signal having the second frequency being the reference frequency divided by the integer in the common mode;
    wherein the plurality of local LO generation circuits includes a filter arranged to extract the synchronization signal having the second frequency being the reference frequency divided by the integer for each of the plurality of local LO generation circuits, each extracted synchronization signal having the second frequency being the reference frequency divided by the integer being used to synchronize a phase of each RF signal having the reference frequency in each of the plurality of local LO generation circuits.

In Example 21 the subject matter of Example 20 may optionally include, wherein the oscillation generation circuit further includes a voltage controlled oscillator for generating the RF signal having a reference frequency, a voltage controlled current supply arranged to convert the RF signal having the reference frequency to an RF current signal having the reference frequency in the differential mode, a divider arranged to divide a copy of the RF signal having the reference frequency by the integer to produce the synchronization signal having the reference frequency divided by the integer.

In Example 22 the subject matter of any one or more of Examples 20-21 may optionally include, wherein the voltage controlled current supply is further arranged to convert the synchronization signal having the second frequency being the reference frequency divided by the integer to a synchronization current signal having the second frequency being the reference frequency divided by the integer in the common mode.

In Example 23 the subject matter of any one or more of Examples 20-22 may optionally include, wherein the filter comprises a current-to-voltage filter, the current-to-voltage extracts the synchronization signal having the second frequency being the reference frequency divided by the integer and converts the RF signal having the reference frequency in the differential mode to an RF voltage signal having the reference frequency.

In Example 24 the subject matter of any one or more of Examples 20-23 may optionally include, wherein the local LO generation circuit further includes a divider to receive the RF voltage signal having the reference frequency in each of the local LO generation circuits to produce a divided RF voltage signal having the reference frequency divided by the integer.

In Example 25 the subject matter of any one or more of Examples 20-24 may optionally include, wherein the divider synchronizes the phase of each RF voltage signal having the reference frequency in each of the plurality of local LO generation circuits using each extracted synchronization signal having the reference frequency divided by an integer.

In Example 26 may include subject matter (such as means for performing acts or machine readable medium including instructions that, when executed by the machine, cause the machine to perform acts) including producing, at an oscillator generation circuit, a radio frequency (RF) signal having a reference frequency in a differential mode and a synchronization signal in a common mode having a second frequency being the reference frequency divided by an integer;
  providing, over each of a plurality of LO lines to a plurality of local LO generation circuits, the RF signal having the reference frequency in the differential mode and the synchronization signal having the second frequency in the common mode;
  extracting a synchronization signal having the second frequency for each of the plurality of local LO generation circuits; and
  synchronizing a phase of each RF signal having the reference frequency in the differential mode in each of the plurality of local LO generation circuits using the extracted synchronization signal having the second frequency.

In Example 27 the subject matter of Example 26 may optionally include, wherein the producing, at the oscillator generation circuit, the RF signal having the reference frequency in the differential mode further comprises creating the RF signal having the reference frequency at the oscillation generation circuit and converting, by a voltage controlled current supply, the RF signal having the reference frequency to an RF current signal having the reference frequency in differential mode.

In Example 28 the subject matter of any one or more of Examples 26-27 may optionally include, wherein the producing, at the oscillation circuit, further comprises creating the RF signal having the reference frequency at the oscillation circuit, dividing a copy of the RF signal having the reference frequency by the integer to produce the synchronization signal and converting, by the voltage controlled current supply, the synchronization signal having the second frequency being the reference frequency divided by the integer to an synchronization current signal having the second frequency being the reference frequency divided by the integer in the common mode.

In Example 29 the subject matter of any one or more of Examples 26-28 may optionally include, wherein the producing, at the oscillator generation circuit, further comprises creating an RF frequency signal having the reference frequency at oscillation circuit, dividing a copy of the RF frequency signal having the reference frequency by a factor of N to produce the synchronization signal having the second frequency being the reference frequency divided by the integer and converting, by a voltage controlled current supply, the synchronization signal having the second frequency being the reference frequency divided by the integer to an synchronization current signal having the second frequency being the reference frequency divided by the integer in the common mode.

In Example 30 the subject matter of any one or more of Examples 26-29 may optionally include, wherein the extracting the synchronization signal having the second frequency being the reference frequency divided by the integer for each of the plurality of local LO generation circuits further comprises using a current to voltage filter to extract the synchronization signal having the second frequency being the reference frequency divided by the integer in the common mode.

In Example 31 the subject matter of any one or more of Examples 26-30 may optionally include, wherein the providing, over each of the plurality of LO lines to the plurality of local LO generation circuits, the RF signal having the reference frequency further comprises providing an RF current signal having the reference frequency to a current to voltage filter to convert the RF current signal having the reference frequency to an RF voltage signal having the reference frequency.

In Example 32 the subject matter (such as means for performing acts or machine readable medium including instructions that, when executed by the machine, cause the machine to perform acts) may include creating, at an oscillator generation circuit, an RF current signal having a reference frequency and a synchronization current signal having a second frequency being the reference frequency divided by an integer;
  providing, over each of a plurality of LO lines to a plurality of local LO generation circuits, the RF current signal in differential mode and the synchronization current signal in common mode to a current-to-voltage source in each of the plurality of local of local LO generation circuits to convert the RF current signal to an RF voltage signal having the reference frequency and to convert the synchronization current signal to a synchronization voltage signal having the reference frequency divided by the integer;
  extracting the synchronization voltage signal having the second frequency being the reference frequency divided by the integer at each of the current-to-voltage sources in each of the plurality of local LO generation circuits; and
  synchronizing a phase of each RF voltage signal having the reference frequency in each of the plurality of local LO generation circuits using each extracted synchronization current signal having the reference frequency divided by the integer.

In Example 33 the subject matter of Example 32 may optionally include, further comprises providing the RF voltage signal having the reference frequency in each of the local LO generation circuits to a divider in each chain to produce a divided RF voltage signal having the reference frequency.

In Example 34 the subject matter of any one or more of Examples 32-33 may optionally include, wherein the synchronizing the phase of each RF voltage signal having the reference frequency in each of the plurality of local LO generation circuits using each extracted synchronization signal having the second frequency being the reference frequency divided by the integer further comprises synchronizing the phase of each RF voltage signal having the reference frequency at the at each divider in each chain using the synchronization signal having the second frequency being the reference frequency divided by the integer of each chain.

In Example 35 the subject matter of any one or more of Examples 32-34 may optionally include, wherein the creating the synchronization current signal having a second frequency being the reference frequency divided by an integer comprises creating the synchronization current signal having a second frequency being the reference frequency divided by two.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for synchronizing chains in a transceiver using central synchronization signals, comprising:
   producing, at an oscillator generation circuit, a radio frequency (RF) signal having a reference frequency in a differential mode and a synchronization signal in a common mode having a second frequency being the reference frequency divided by an integer;
   providing, over each of a plurality of LO lines to a plurality of local LO generation circuits, the RF signal having the reference frequency in the differential mode and the synchronization signal having the second frequency in the common mode;
   extracting a synchronization signal having the second frequency for each of the plurality of local LO generation circuits; and
   synchronizing a phase of each RF signal having the reference frequency in the differential mode in each of the plurality of local LO generation circuits using the extracted synchronization signal having the second frequency.

2. The method of claim 1, wherein the producing, at the oscillator generation circuit, the RF signal having the reference frequency in the differential mode further comprises creating the RF signal having the reference frequency at the oscillation generation circuit and converting, by a voltage controlled current supply, the RF signal having the reference frequency to an RF current signal having the reference frequency in the differential mode.

3. The method of claim 2, wherein the producing, at the oscillation circuit, further comprises creating the RF signal having the reference frequency at the oscillation circuit, dividing a copy of the RF signal having the reference frequency by the integer to produce the synchronization signal and converting, by the voltage controlled current supply, the synchronization signal having the second frequency being the reference frequency divided by the integer to an synchronization current signal having the second frequency being the reference frequency divided by the integer in the common mode.

4. The method of claim 1, wherein the producing, at the oscillator generation circuit, further comprises creating an RF frequency signal having the reference frequency at oscillation circuit, dividing a copy of the RF frequency signal having the reference frequency by a factor of N to produce the synchronization signal having the second frequency being the reference frequency divided by the integer and converting, by a voltage controlled current supply, the synchronization signal having the second frequency being the reference frequency divided by the integer to an synchronization current signal having the second frequency being the reference frequency divided by the integer in the common mode.

5. The method of claim 1, wherein the extracting the synchronization signal having the second frequency being the reference frequency divided by the integer for each of the plurality of local LO generation circuits further comprises using a current to voltage filter to extract the synchronization signal having the second frequency being the reference frequency divided by the integer in the common mode.

6. The method of claim 1, wherein the providing, over each of the plurality of LO lines to the plurality of local LO generation circuits, the RF signal having the reference frequency further comprises providing an RF current signal having the reference frequency to a current to voltage filter to convert the RF current signal having the reference frequency to an RF voltage signal having the reference frequency.

7. A method for synchronizing chains in a transceiver using a central synchronization signal, comprising:
   creating, at an oscillator generation circuit, a RF current signal having a reference frequency and a synchronization current signal having a second frequency being the reference frequency divided by an integer;

providing, over each of a plurality of LO lines to a plurality of local LO generation circuits, the RF current signal in differential mode and the synchronization current signal in common mode to a current-to-voltage source in each of the plurality of local of local LO generation circuits to convert the RF current signal to an RF voltage signal having the reference frequency and to convert the synchronization current signal to a synchronization voltage signal having the reference frequency divided by the integer;

extracting the synchronization voltage signal having the second frequency being the reference frequency divided by the integer at each of the current-to-voltage sources in each of the plurality of local LO generation circuits; and synchronizing a phase of each RF voltage signal having the reference frequency in each of the plurality of local LO generation circuits using each extracted synchronization current signal having the reference frequency divided by the integer.

8. The method of claim 7 further comprises providing the RF voltage signal having the reference frequency in each of the local LO generation circuits to a divider in each chain to produce a divided RF voltage signal having the reference frequency.

9. The method of claim 8, wherein the synchronizing the phase of each RF voltage signal having the reference frequency in each of the plurality of local LO generation circuits using each extracted synchronization signal having the second frequency being the reference frequency divided by the integer further comprises synchronizing the phase of each RF voltage signal having the reference frequency at the at each divider in each chain using the synchronization signal having the second frequency being the reference frequency divided by the integer of each chain.

10. The method of claim 7, wherein the creating the synchronization current signal having a second frequency being the reference frequency divided by an integer comprises creating the synchronization current signal having a second frequency being the reference frequency divided by two.

11. A multiple-input, multiple-output (MIMO) transceiver, comprising:
an oscillator generation circuit arranged to produce a RF signal having a reference frequency in a differential mode and a synchronization signal having a second frequency being the reference frequency divided by an integer in a common mode; and
a plurality of local LO generation circuits used to generate a separate component of a MIMO transmission, the local LO generation circuits being coupled to the oscillation generation circuit via a plurality of LO lines, the plurality of local LO generation circuits arranged to receive the RF signal having the reference frequency in a differential mode and the synchronization signal having the second frequency being the reference frequency divided by the integer in the common mode;
wherein the plurality of local LO generation circuits includes a filter arranged to extract the synchronization signal having the second frequency being the reference frequency divided by the integer for each of the plurality of local LO generation circuits, each extracted synchronization signal having the second frequency being the reference frequency divided by the integer being used to synchronize a phase of each RF signal having the reference frequency in each of the plurality of local LO generation circuits.

12. The MIMO transceiver of claim 11, wherein the oscillation generation circuit further includes a voltage controlled oscillator for generating the RF signal having the reference frequency.

13. The MIMO transceiver of claim 12, wherein the oscillation generation circuit further includes a voltage controlled current supply arranged to convert the RF signal having the reference frequency to an RF current signal having the reference frequency in the differential mode.

14. The MIMO transceiver of claim 13, wherein the oscillation generation circuit further includes a divider arranged to divide a copy of the RF signal having the reference frequency by the integer to produce a synchronization signal having the reference frequency divided by the integer.

15. The MIMO transceiver of claim 14, wherein the voltage controlled current supply is further arranged to convert the synchronization signal having the second frequency being the reference frequency divided by the integer to a synchronization current signal having the second frequency being the reference frequency divided by the integer in the common mode.

16. The MIMO transceiver of claim 11, wherein the filter extracts the synchronization signal having the reference frequency divided by the integer.

17. The MIMO transceiver of claim 16, wherein the filter is arranged to convert the RF signal having the reference frequency in the differential mode to an RF voltage signal having the reference frequency.

18. The MIMO transceiver of claim 17, wherein the local LO generation circuit further includes a divider to receive the RF voltage signal having the reference frequency in each of the local LO generation circuits to produce a divided RF voltage signal having the reference frequency divided by the integer.

19. The MIMO transceiver of claim 18, wherein the divider synchronizes the phase of each RF voltage signal having the reference frequency in each of the plurality of local LO generation circuits using each extracted synchronization signal having the reference frequency divided by the integer.

20. A communication device, comprising:
a multiple-input, multiple-output (MIMO) transceiver having a plurality of transceiver chains including receiver and transceiver chains, wherein the transceiver chains are used to transmit and receive a separate component of a MIMO signal, and
a synchronized local oscillator system for synchronizing signals in at least one of the plurality of transceiver chains, wherein the synchronized local oscillator system includes:
an oscillator generation circuit arranged to produce an RF signal having a reference frequency in a differential mode and a synchronization signal having a second frequency being the reference frequency divided by an integer in a common mode; and
a plurality of local LO generation circuits associated with at least one of the plurality of transceiver chains, coupled to the oscillation generation circuit via a plurality of LO lines, the plurality of local LO generation circuits arranged to receive the RF signal having the reference frequency in a differential mode and the synchronization signal having the second frequency being the reference frequency divided by the integer in the common mode;
wherein the plurality of local LO generation circuits includes a filter arranged to extract the synchronization signal having the second frequency being the reference frequency divided by the integer for each of the plurality of local LO generation circuits, each extracted synchronization signal having the second frequency being the reference frequency divided by the integer being used to synchronize a phase of each RF signal having the reference frequency in each of the plurality of local LO generation circuits.

21. The MIMO transceiver of claim 20, wherein the oscillation generation circuit further includes a voltage controlled oscillator for generating the RF signal having a reference frequency, a voltage controlled current supply arranged to convert the RF signal having the reference frequency to an RF current signal having the reference frequency in the differential mode, a divider arranged to divide a copy of the RF signal having the reference frequency by the integer to produce the synchronization signal having the reference frequency divided by the integer.

22. The MIMO transceiver of claim 21, wherein the voltage controlled current supply is further arranged to convert the synchronization signal having the second frequency being the reference frequency divided by the integer to a synchronization current signal having the second frequency being the reference frequency divided by the integer in the common mode.

23. The MIMO transceiver of claim 20, wherein the filter comprises a current-to-voltage filter, the current-to-voltage extracts the synchronization signal having the second frequency being the reference frequency divided by the integer and converts the RF signal having the reference frequency in the differential mode to an RF voltage signal having the reference frequency.

24. The MIMO transceiver of claim 23, wherein the local LO generation circuit further includes a divider to receive the RF voltage signal having the reference frequency in each of the local LO generation circuits to produce a divided RF voltage signal having the reference frequency divided by the integer.

25. The MIMO transceiver of claim 24, wherein the divider synchronizes the phase of each RF voltage signal having the reference frequency in each of the plurality of local LO generation circuits using each extracted synchronization signal having the reference frequency divided by an integer.

* * * * *